UNITED STATES PATENT OFFICE.

CORNELIUS MASSATSCH, OF BERLIN-TEMPELHOF, GERMANY, ASSIGNOR TO THE PERMUTIT COMPANY, OF NEW YORK, N. Y., A CORPORATION OF DELAWARE.

MANUFACTURE OF PURIFYING MATERIALS.

1,343,927.  Specification of Letters Patent.  Patented June 22, 1920.

No Drawing.   Application filed August 18, 1914. Serial No. 857,373.

*To all whom it may concern:*

Be it known that I, CORNELIUS MASSATSCH, a subject of the German Emperor, residing at Berlin-Tempelhof, Germany, have invented certain new and useful Improvements in the Manufacture of Purifying Materials, of which the following is a specification.

This invention relates to the manufacture of purifying materials; and it comprises a method of preparing a base-exchanging purifying material in the wet way as hard, mechanically strong and resistant granules of pervious nature suitable for the purification of water and other purposes, wherein a precipitated or wet mass of material containing silica, alumina and alkali is prepared in any suitable manner, as by precipitating a solution of an aluminate of an alkali metal (such as potassium aluminate or sodium aluminate) by a solution of a silicate of an alkali metal (such as sodium silicate or potassium silicate), this material is washed to remove a part, but not all, of the contained alkali, is then cautiously indurated by drying at a temperature below 100° C. until a part, but not all, of the contained water of hydration is removed and the mass acquires a stony or horny appearance and the property of breaking up with water and the dried material is once more treated with water or rehydrated to cause it to break up and granulate; and it further comprises as a new article of manufacture a base-exchanging and water purifying material in hard, pervious granules exhibiting no tendency to slime with water, such granules having the composition of an indurated, partially dehydrated and rehydrated precipitate of silica and alumina containing some alkali; all as more fully hereinafter set forth and as claimed.

The use of base-exchanging silicates or "zeolites", artificial or natural, for purifying water has grown rapidly in recent years and many ways have been proposed for making materials suitable for this purpose. The conditions of operation, as for instance, in purifying hard water by exchange of its lime and magnesia for soda, are however severe, and extreme requirements, both chemical and physical, must be met by a technically satisfactory material; a material which when used in granular form in purifying beds of the general nature of a filtering bed will be durable and of long life, withstanding repeated use and revivification without sliming or crumbling. It must of course have a high exchange power so that a given weight may take up, for instance, as great a per cent. of lime and magnesia as possible in softening hard water before revivification becomes necessary. High exchange power necessitates material of porous or pervious nature in order to secure a maximum active area for contact with the water or other liquid to be purified and the granules must be small and reasonably uniform in size. On the other hand the material must be mechanically strong; it must have sufficient strength when used in beds or columns to support not only the weight of the material itself in the bed but the weight and pressure of the water or other liquid to be treated. And the granules must retain their shape for an indefinite time without mashing down or mudding together and they must not slime, erode or wash away.

Naturally, material combining high chemical activity and porosity with extreme physical resistivity and great mechanical strength is not readily prepared; and particularly in the wet way. High exchange power, that is high chemical reactivity, may be exhibited by many precipitates which can be formed in the wet way, as by precipitating a solution of potassium aluminate by one of sodium silicate; but such precipitates are in a physical state rendering them useless for practical utilization, being usually gelatinous or gummy. The physical character of the precipitate varies according to the circumstances, such as the concentration of the reacting liquids, the temperature, etc. Frequently it forms as a translucent jelly, at first filling the entire liquid and then gradually becoming lumpy. Sometimes this lumping takes place only on heating; sometimes the precipitate forms as flakes which then easily coalesce or adhere together as lumps. These precipitates are substantially useless for filtration purposes and cannot be used technically. Simple drying and heating do not suffice to convert these precipitates into material useful for technical purposes; drying, unless done in a special way, as hereinafter indicated, being apt to give a product sliming with water. Heating to high temperatures and complete dehydration causes loss of reactivity. For these reasons in the existing commercial art the exchange material is not made in the wet way but is prepared by a fusion process; a glass being prepared and this being afterward granulated, extracted and hydrated in special ways.

I have found, however, that a material exhibiting the necessary combination of chemical, physical and mechanical properties may be simply, easily and economically prepared by a particular treatment of the slimy, gelatinous or gummy alumino-silicate precipitates or materials made in the various wet methods. Any of the known wet methods may be employed for making this precipitate or initial material but that formed by precipitating a solution of an aluminate of an alkali metal by a silicate of an alkali metal is particularly suitable. The alkaline base of the silicate and of the aluminate may be either soda or potash. Both may be present in the reacting solution.

One suitable precipitate may be made by mixing equivalent amounts of solutions of potassium aluminate and sodium silicate. A solution of aluminate containing both soda and potash as bases is still better. The silicate solution may be in excess without harm. A solution of ordinary "water glass" (sodium silicate) may be used, it being immaterial whether the dissolved silica is present as chemically pure sodium silicate or as polysilicates. In the precipitation a portion of the alkali separates and remains in solution, while a portion remains in the precipitate. The solutions may or may not contain foreign salts as sodium chlorid, sodium sulfate, etc., and may be dilute or concentrated. Dilute solutions may give a precipitate which is, in a degree, flaky and easier to wash and handle in the hereinafter described process, but concentrated, or even saturated, solutions are more economical. Precipitation may be effected at the ordinary temperature or may be effected with hot solutions. A precipitate made by mixing a solution of aluminum sulfate with a solution of potash or soda silicate under conditions giving an alkaline admixture, is also suitable. Suitable material may also be made by treating sodium aluminate solutions with hydrated silica. Additions of hydrated silica before precipitation are also sometimes useful in the previously described methods. For example, a solution of an aluminate of an alkali metal may be treated with precipitated silica. The materials made in any of these ways contain coprecipitated alkali. They may be treated with calcium chlorid to replace contained soda or potash by lime prior to the hereinafter described process. Or a solution of calcium chlorid may be added during precipitation.

Wet, voluminous, gummy, gelatinous or flaky materials precipitated or otherwise made in any of these ways, may be treated to obtain the particular mechanically strong, hard and resistant but reactive granulated product of the present invention.

In this treatment an important step is granulation by water of a hard dried material obtained in a certain stage of the operation; water causing the hard material to decrepitate or break up into small angular granules of the desired character and size. This decrepitation or breaking up appears to be, at least in part, due to a retention of a proportion of alkali in the dried material; a condition which will result from the retention therein of a certain proportion of the mother liquor.

In the process hereinafter specifically described this result of leaving a proportion of the mother liquor in the dried precipitate is insured by regulating the washing operation to which the precipitated material is subjected; this operation being so controlled that while much of the alkali (or mother liquor containing alkali) is removed a proportion thereof still remains in the washed precipitate. Upon the degree of washing depends much of the character of the final material. There are a number of incidental advantages to this partial washing; one being that it greatly shortens the time of operation and lessens the amount of water required, thereby materially reducing the cost of operation. Before, during or after this washing the material is advantageously but not necessarily submitted to pressure to compact it. Both the partial washing and the compression may be effected in a filter press; thereby enabling washing and compression to be rapidly effected as the time required for passing each lot of precipitate through the press is comparatively short. Further, the filter press cake so made is in better condition for subsequent operations than if all the alkali in solution had been entirely removed. After washing and compression the material is next slowly and carefully indurated by drying it at a temperature below 100° C. A temperature of about 75° C. is advantageous. The time during which the drying operation is continued of course depends on the particular apparatus used and upon the size of the cake or cake fragments but drying should always be slow. Any ordinary type of drying apparatus may be used. The induration is a dehydrating as well as a drying operation but the dehydration is only partial. In pressing and forming a cake not only is there a condensation or reduction of the volume of the precipitate formed with the quantity of liquid reduced, thereby reducing, to that extent, the necessity for washing in removing the desired amount of alkali, but the material is in better condition for induration and rehydrating as hereinafter described. During induration the material hardens gradually to form a translucent hornlike mass having a white to grayish-yellow color (according to the purity of the materials) and a shell-like or conchoidal fracture. When properly indurated the material becomes a white stony mass which upon treatment with hot or cold water breaks up with strong decrepitation into small angular, more or less translucent, hard granules. The end of the induration treatment may be known by the occurrence of this action on treating a sample with water. This breaking up is probably in part due to solution of retained alkali and in part to a rehydration of the indurated mass. At this time the drying or induration is interrupted and the material once more treated with water. Part of this retained alkali is removed by this treatment. On treatment with water either cold or hot the indurated material breaks up into granules having a diameter of 1 to 3 millimeters. These granules which represent a highly active "artificial zeolite," are washed and are then ready for use. This second washing or lixiviation may be performed in special vessels or apparatus or may be done in the final apparatus or "filters" in which the material is ultimately to be used.

In the first washing stage, presuming the material obtained by direct precipitation of aluminate solution by silicate solution be used, if the washing is carried so far that a liter of the final wash water requires at least 0.5 cc. but not more than 15 cc. of normal hydrochloric acid (a solution containing 36.5 grams HCl per liter) the best products are obtained on induration and on rehydration; the indurated and rehydrated material breaking up into small granules of uniform size.

The product obtained after the rehydration is in angular fragments, usually like coarse sand or fine gravel in size. The granules or fragments are translucent and devoid of visible pores, but on treatment with phenolphthalein solution they become pink colored (from residual alkali) throughout their mass, showing a minute perviousness and, therefore, admit of a great surface action. On treatment with suitable dyes, such as a solution of methylene blue, the granules become colored throughout their mass. They are highly active in exchange, taking up relatively great amounts of lime or other base before requiring revivification. But in spite of their porosity the granules are strong, easily supporting the weight of a filter bed or column without mashing down, eroding, or sliming, even after long continued use. The sharp angles remain after long use and a filter bed or column retains its perviousness. They are composed substantially of alumina, silica, alkali and water, the water existing as water of hydration. The alkali may be either potash or soda. Advantageously both bases are present. Lime may also be present. In the induration, the water or hydration of the original precipitate is partially driven off and the loss is partially replaced in the subsequent water treatment.

While I have hereinbefore described the present process as applied to exchange materials containing alumina, silica and alkali, or alkali and lime, it may also be advantageously used with exchange materials prepared in the wet way and containing other alkali-soluble, or amphoteric oxids (that is oxids which, like alumina, have both acid and basic properties) such as lead oxid, tin oxid, zinc oxid, titanic oxid, etc., replacing a part or all of the alumina. Materials containing other bases than lime, such as strontia, baryta, magnesia, manganese oxid, etc., may also be so treated.

After the second washing, the material may be again cautiously dried, as by air drying, in the event that it is to be stored or shipped. Otherwise it may be simply dumped wet into the purifiers in which it is to be used if the final (second) washing has not been effected in such purifiers, as it may be. In drying, it is desirable not to remove more than the water mechanically present as moisture; the material should not be further dehydrated. If this drying be pushed too far the material may become crumbly or form dust to some extent.

The pressure applied to the wet material prior to the indurating operation is of great advantage in obtaining the desired mechanically strong, minutely pervious material. In using filter presses it is best to use pressures in excess of those which will suffice to press out the water. Advantageously, the pressure may be very much higher. Of course in this respect much depends upon the particular physical characteristics of the wet material which is being treated and the dimensions of the cake under pressure. But as a general rule with ordinary filter presses at least 6 to 8 pounds pressure per square inch is used. As the wet material enters the press it contains much moisture in what may be called a mechanically intermingled state. This moisture should be pressed out as completely as possible since otherwise the final material is apt to be spongy in texture, instead of having the minutely pervious character desired, and is also apt to disintegrate irregularly in the final granulating washing.

The pressure can of course, and often advantageously, be applied in two or more stages. For example the cake from a filter press may be further pressed, as by using a hydraulic press.

While I have described washing in a filter press, it is of course obvious that washing may be in other ways, as by decantation, suction, etc.

What I claim is:—

1. The process of making a granular water-purifying substance which comprises washing a hydrated material comprising coprecipitated alumina, silica and alkali till a portion but not all of the alkali is removed and indurating by drying at low temperatures.

2. The process of making a granular water-purifying substance which comprises washing a hydrated material comprising coprecipitated alumina, silica and alkali till a portion but not all of the alkali is removed, indurating by drying at low temperatures and treating with water.

3. The process of making a granular water-purifying substance which comprises precipitating a solution of aluminate by a solution of silicate, washing the precipitate, removing a portion but not all of the alkali, indurating by drying at a temperature below 100° C. and treating with water.

4. The process of making a granular water-purifying substance which comprises precipitating a solution of aluminate by a solution of silicate, washing the precipitate until a liter of the washing water requires for its neutralization at least 0.5 cubic centimeters of normal hydrochloric acid but not more than 15 cubic centimeters of normal hydrochloric acid, pressing the precipitate, indurating by drying at a temperature below 100° C. until the material decrepitates with water and treating with water.

5. The process of preparing material for treating water which comprises producing in an alkaline medium, a precipitate containing alkali, alumina and silica, washing this precipitate until a substantial proportion of alkali is removed with the wash water while a substantial proportion of alkali still remains in the precipitate, indurating by drying the so treated precipitate until a portion but not all of the water of hydration has been removed and the material decrepitates with water and treating the dried material with water.

6. The process of preparing a hard granular material for purifying water and similar purposes which comprises producing a precipitate containing an alkali, silica and an alkali soluble oxid, washing till a portion but not all of the alkali is removed, indurating at a low temperature until a sample of the material on treatment with water breaks up into granules and then rewashing.

7. The process of making a granular water-purifying substance which comprises washing a hydrated coprecipitated silica, alkali and alkali-soluble oxids till a portion but not all of said alkali is removed, indurating by drying at low temperatures and treating with water.

8. In the manufacture of granular water-purifying materials the process of treating materials comprising coprecipitated silica, alkali and alkali-soluble oxid which comprises washing and pressing such a material, the washing being carried to a point where a substantial proportion of such alkali is removed while a substantial proportion still remains, indurating the washed and pressed material by drying at low temperatures and washing with water.

9. In the manufacture of granular water-purifying materials the process of treating materials comprising coprecipitated silica, alkali and alumina which comprises washing and pressing such a material, the washing being carried to a point where a substantial proportion of such alkali is removed while a substantial proportion still remains, indurating the washed and pressed material by drying at low temperatures and washing with water.

10. In the manufacture of granulated water-purifying materials from wet hydrated precipitates containing silica, alkali and alkali-soluble oxid, the process which comprises washing and compressing such a material, the pressure being higher than that which is necessary merely to remove the excess of mechanically held water and the washing being sufficient to remove a substantial proportion but not all of the contained alkali, and thereafter indurating the washed and pressed material by drying at a low temperature until a sample on treatment with water will break up into angular granules.

11. In the manfacture of granulated water-purifying materials from wet hydrated precipitates containing silica, alkali and alumina, the process which comprises washing and compressing such a material, the pressure being higher than that which is necessary merely to remove the excess of mechanically held water and the washing being sufficient to remove a substantial proportion but not all of the contained alkali, and thereafter indurating the washed and pressed material by drying at a low temperature until a sample on treatment with water will break up into angular granules.

12. In the manufacture of water purifying materials the process which comprises drying a precipitated material containing alkaline mother liquor until a sample on treatment with water will decrepitate into small angular granules of the desired size and then treating such material with water.

13. In the manufacture of water purifying materials the process which comprises producing a dried hard mass of coprecipitated silica and alumina, said mass also containing alkaline mother liquor, and treating the same with water to cause it to break up into small granules or fragments.

14. As a new article of manufacture, a hard granular translucent material composed of alumina, silica, alkali, and water of hydration, the granules exhibiting no visible pores, but on treatment with phenolphthalein solution becoming pink throughout their mass, such granules having the properties of a precipitate from an alkaline solution deprived of part but not all of its free alkali.

15. As a new article of manufacture, a hard granular translucent material composed of silica, alkali and alkali-soluble oxid, and water of hydration, the granules exhibiting no visible pores, but on treatment with phenolphthalein solution becoming pink throughout their mass, such granules having the properties of a precipitate from an alkaline solution deprived of part but not all of its free alkali.

16. A hard dried mass of coprecipitated silica and alumina, said mass containing a proportion of alkaline mother liquor and being capable of breaking up into small granules or fragments on treatment with water.

In testimony whereof, I affix my signature in the presence of two subscribing witnesses.

CORNELIUS MASSATSCH.

Witnesses:
HENRY HASPER,
WOLDEMAR HAUPT.